3,125,414
PRODUCTION OF SULFAMIC ACID
Everett E. Gilbert, Morris Township, Morris County, and Henry R. Nychka, Randolph Township, Morris County, N.J., assignors to Allied Chemical Corporation, New York, N.Y., a corporation of New York
No Drawing. Filed Feb. 19, 1962, Ser. No. 174,272
3 Claims. (Cl. 23—166)

This invention relates to sulfamic acid and more particularly refers to a new and improved method for producing sulfamic acid by reacting urea, sulfur trioxide and sulfuric acid.

Although the reaction of sulfuric acid, sulfur trioxide and urea was known—Baumgarten U.S. Patent 2,102,350, Ber. 69B, 1929-37—from a practical commercial operation many problems were encountered due to the inherent nature of the reaction which is strongly exothermic and normally proceeds with considerable violence. In addition the resultant product, sulfamic acid is a relatively high melting point chemical, 205° C., and consequently presents a serious problem with respect to processing and separation of the sulfamic acid from the reaction products as well as heat transfer. Various methods have been proposed to overcome these processing problems with indifferent success. In one suggestion, it has been proposed to premix the reagents at a temperature below that required for the formation of sulfamic acid followed by heating to the higher temperature necessary for it to occur. According to this procedure, the exothermic effect of the reaction is minimized; however, new problems are created since this two-stage process requires costly apparatus, is time consuming, employs brine cooling, an expensive procedure, to keep the temperature within the required low range of the initial premix, and is also hazardous to operate since the reaction mixture is chemically unstable and may react with extreme and uncontrollable violence if it is not carefully refrigerated and used promptly. Another suggestion was to use excess sulfuric acid which permitted the reaction to be carried out in a liquid phase thereby providing a means for dissipating the heat. This procedure however, did not ameliorate all the difficulties and indeed created new problems. More specifically, sulfuric acid being a reactant did not avoid the violence of the reaction and resulted in a slurry of sulfamic acid in sulfuric acid solution from which it was most difficult to separate the sulfamic acid. Furthermore, there remained in the product sulfamic acid amounts of sulfuric acid which was also most difficult to remove. In addition the operation was complicated by corrosion problems brought about by the many different strengths of sulfuric acid involved. In another attempt to overcome the problems, excess sulfur trioxide also a reactant, was used as a reaction medium where again it was found difficult to control the reaction and also to remove residual sulfur trioxide from the product.

An object of the present invention is to provide an efficient economical process for producing sulfamic acid by reacting urea, sulfur trioxide and sulfuric acid. Another object is to obtain a good control of the reaction of urea, sulfur trioxide and sulfuric acid and to permit easy separation of sulfamic acid from the reaction mixture. A further object is to eliminate the need for the two-step procedure of the prior art i.e., premixing the reagents at a low temperature to inhibit sulfamic acid formation followed by heating at higher temperatures necessary for it to occur. Other objects and advantages will be apparent from the following description.

In consideration of a good practical commercial process for producing sulfamic acid several factors must be taken into account. For good economical operation the process should not be time consuming and in addition, should utilize a solvent which is inert to the reactants and which serves to dissipate the exothermic heat of reaction. Moreover, the raw materials should be soluble in the solvent and the formed product insoluble in it so that it can easily be separated from the reaction mixture.

In our investigation we found that when sulfur dioxide was used as a medium for the reactants, according to the process of the present invention, it acted as a cushioning or tempering agent for the reactants and provided such effective heat control that the process was permitted to be conducted throughout at temperatures within the sulfamic acid forming range without hazardous operating conditions or danger of explosion. Thus, there was no need to premix the reagents at temperatures below the sulfamic acid forming range and moreover, river water could be used as the cooling medium rather than the expensive brine cooling solution of the prior art. Another advantage of sulfur dioxide as the reaction medium is that it is inert to the reactions which take place. Further, the reactants are soluble in the sulfur dioxide medium and the formed product sulfamic acid insoluble, thereby permitting easy separation of the product from the reaction medium by any suitable procedure such as by filtration or centrifuge. Moreover, since sulfur dioxide boils at about $-10°$ C., at atmospheric pressure, it can easily and completely be removed from the product sulfamic acid and, if desired, advantageously returned to the process.

In accordance with the present invention, sulfamic acid may be prepared in an efficient and economical manner in high yields by gradually adding oleum to a mixture of urea and liquid sulfur dioxide over a short period of time such as from 1 minute to 20 minutes, preferably about 5–8 minutes, maintaining the temperature during addition within the range of about 55° to 110° C., preferably about 80° to 90° C. at superatmospheric pressures, thereafter maintaining the temperature at about 90° to 105° C. preferably 90° to 100° C. and continuing the reaction for about 60 minutes to about 80 minutes, preferably about 70 minutes to effect complete reaction of the mixture to produce sulfamic acid which is insoluble and forms a slurry in the sulfur dioxide, releasing evolved carbon dioxide from the reaction mixture and separating the sulfamic acid from the sulfur dioxide.

In carrying out the process of the present invention, the reactants may be brought together in a variety of ways. A convenient method is to add the oleum to a mixture of urea and liquid surfur dioxide. Alternatively, the oleum can be predissolved in a portion of the liquid sulfur dioxide and thereafter the mixture added to a mixture of urea and liquid sulfur dioxide. In preferred operation, the liquid sulfur dioxide and urea are mixed together and heated slightly with stirring to a temperature conducive to the formation of sulfamic acid. Thereafter, oleum is added over a short period of time such as from about 1 minute to about 20 minutes preferably about 5–8 minutes, and the reaction is allowed to proceed with continued agitation until completion as evidenced by cessation of evolved carbon dioxide gas. The temperature during the addition of oleum to the mixture of urea and sulfur dioxide should be such that sulfamic acid is formed and precipitated in sulfur dioxide while the oleum is being added. To accomplish this, the sulfur dioxide and urea may be preheated and thereafter brought together or they may be introduced into a heated zone wherein the necessary sulfamic acid forming temperature is maintained. We have found that a temperature of at least above about 55° C. is suitable for these purposes with optimum results being obtainable when the temperature involved during the addition of oleum to sulfur dioxide and urea is at least about 80° C. As mentioned previously, the oleum is added over a short period of time and the reaction is allowed to proceed with continued agitation. At this stage, we have found that cooling the reaction medium may be unnecessary since the sulfur dioxide tempers the reaction and although the heat of reaction increases during the addition of oleum, the sulfur dioxide prevents hazardous operating conditions or danger of explosions and indeed the heat increase is beneficial to the process inducing more rapid reaction. After the addition of oleum is complete, agitation is continued and the temperature maintained within the range of 90° to 105° C. by employing any suitable cooling apparatus such as a jacket surrounding the reaction vessel through which a cooling medium such as river water flows. The time necessary to complete the reaction after the addition of oleum, sulfur dioxide and urea is variable and depends upon the temperatures utilized. With temperatures in the range of about 90° to 105° C. the reaction is generally complete as evidenced by cessation of evolved carbon dioxide gas after about 60 to 80 minutes. Other conditions which affect the yield of sulfamic acid are the concentration and proportions of the reactants. Optimum yields of sulfamic acid are obtained when the reactants urea, surfur trioxide and sulfuric acid are used in such proportions that substantially equimolar equivalent quantities are ultimately present, that is for each mol of urea there is one mol of surfuric acid and one mol of surfur trioxide. If a large excess of sulfuric acid is used it turns up as an impurity in the crude product, whereas if sulfuric acid is substantially deficient, the product contains unreacted urea. The proportions of sulfur trioxide used may be somewhat in excess of the calculated proportion theoretically required since carbon dioxide is evolved during the reaction, and a small portion of the sulfur trioxide present may be carried off with the evolved carbon dioxide. Thus, a molar ratio of sulfur trioxide to urea in the order of about 1.0–1.3 to 1 has been found satisfactory. Although molar ratios in excess of this amount are operable no advantage is obtained by using them.

The amount of sulfur dioxide admixed with the reaction medium should be such that the slurry which is formed by the precipitation of sulfamic acid is easily managed and in addition, there should be enough sulfur dioxide present to provide tempering of the reaction. For these purposes, molar ratios of sulfur dioxide to urea in the range of 10–25 to 1, preferably a ratio of 15–20 to 1 are suitable. Below this molar range the thickened reaction slurry creates manipulating problems and tends to complicate that satisfactory separation of the formed sulfamic acid. Although more than 25 mols of sulfur dioxide may be used per mol of urea, no particular advantage is gained thereby.

In operation the reaction should take place under superatmospheric conditions in order to prevent the evolution of sulfur dioxide vapors. The pressure which should be maintained in the reaction zone is variable and depends on the temperatures maintained for the reaction which takes place. We have found that a minimum pressure of about 100 p.s.i.g. should be maintained in the reaction zone during the addition of the reactants. As the reaction proceeds, carbon dioxide gas is evolved which increases the pressure in the reaction zone. The operation may be conducted at pressures as high as 600 p.s.i.g. or more with good results.

As mentioned previously, sulfamic acid is formed upon the addition of urea to sulfur trioxide, sulfuric acid and sulfur dioxide and begins to precipitate in the sulfur dioxide medium due to its insolubility in it. The separation of sulfamic acid product from the reaction medium can be effected by any suitable means such as by filtration or centrifuging preferably filtration because of the ease and rapidity with which the separation takes place. Slight amounts of sulfur dioxide remaining in the product sulfamic acid can be conveniently removed simply by decreasing the pressure which can be accomplished either by transferring the sulfamic acid product to another reaction vessel wherein the decreased pressure is maintained, or on the other hand, by decreasing the pressure in the reaction zone so as to evolve vapors of sulfur dioxide which may be condensed and returned to the process.

If desired, sulfuric acid may be gradually added over a short period of time to the reaction vessel which contains liquid sulfur dioxide and urea, previously heated to a temperature of about 60° C. Thereafter, sulfur trioxide may be added to the formed urea bisulfate and sulfur dioxide over a short period of time such as about 7 to 15 minutes at a temperature maintained within the range of 57° to 60° C. After addition, the temperature is permitted to reach about 90° C. The reaction is generally complete upon cessation of evolved carbon dioxide gas and generally runs from 2¾ to 3½ hours after total addition is complete. After completion of the reaction, the product sulfamic acid is separated from the reaction mixture as heretofore explained.

The following examples illustrate the present invention.

*Example 1*

To a reaction vessel equipped with provision for stirring and heating was charged 1130 parts liquid sulfur dioxide and 60 parts urea. The charge was warmed with stirring to 87° C., at which temperature 192 parts oleum was added over 6 minutes with no cooling. The temperature rose to 94° C. and the pressure rose more than would result from the temperature rise alone, proving that carbon dioxide was being evolved during addition. The reaction mixture was stirred 70 minutes at 92° to 102° C. to complete reaction, then cooled to room temperature. The reaction mixture was worked up by evaporation of the sulfur dioxide. A 76% yield was obtained.

*Example 2*

To a reaction vessel was charged 1250 parts liquid sulfur dioxide and 60 parts urea. The charge was warmed to 61° C. and then 102 parts sulfuric acid was added over 7 minutes at 62° to 64° C. to form urea bisulfate. 110 parts sulfur trioxide was then added over 9 minutes with no cooling over a temperature range of about 57° to 60° C. The pressure rose from 130 to 160 p.s.i.g. indicating evolution of carbon dioxide during addition. Stirring was continued for 3 hours, during which time the temperature was raised to 85° C. The reaction mixture was worked up by evaporating the liquid sulfur dioxide for a 90% yield of sulfamic acid.

Although certain preferred embodiments of the invention have been disclosed for purposes of illustration, it will be evident that various changes and modifications may be made therein without departing from the scope and spirit of the invention.

We claim:

1. A process for the production of sulfamic acid which comprises mixing urea, sulfuric acid, sulfur trioxide and sulfur dioxide, maintaining the mixture at a temperature within the range of 55° to 110° C. under superatmospheric pressure to effect reaction of the mixture to produce sulfamic acid which is insoluble and forms a slurry in the sulfur dioxide and also by-product carbon dioxide, releasing evolved carbon dioxide from the reaction mixture, and separating sulfamic acid from the sulfur dioxide.

2. A process for the production of sulfamic acid which comprises adding oleum to a mixture of urea and liquid sulfur dioxide in an enclosed reaction zone under superatmospheric pressure, maintaining the reaction mixture during the addition of oleum within a range of about 80° to 90° C. to effect reaction of oleum and urea to produce sulfamic acid and by-product carbon dioxide, thereafter maintaining the temperature in the reaction zone after total oleum addition within a range of 90° to 105° C. until substantial completion of the reaction of oleum and urea, discharging evolved carbon dioxide and recovering sulfamic acid from the sulfur dioxide.

3. A process for the production of sulfamic acid which comprises adding oleum to a mixture of urea and sulfur dioxide in the proportion of substantially equimolar quantities of urea, sulfuric acid and sulfur trioxide and 10–25 mols of sulfur dioxide per mol of urea, maintaining the mixture at a temperature within a range of 55° to 90° C. in an enclosed reaction zone under superatmospheric pressure of 100 to 600 p.s.i.g. to effect reaction of urea and oleum to produce sulfamic acid and by-product carbon dioxide, thereafter maintaining the temperature in the reaction zone after total oleum addition within a range of 90° to 105° C. until substantial completion of the reaction of urea, sulfuric acid and sulfur trioxide, discharging evolved carbon dioxide, filtrating the reaction products of sulfamic acid in sulfur dioxide to separate sulfamic acid and returning sulfur dioxide filtrate for admixture with additional oleum and urea.

References Cited in the file of this patent

UNITED STATES PATENTS

| | | |
|---|---|---|
| 2,408,823 | Tauch | Oct. 8, 1946 |
| 2,436,658 | McQuard | Feb. 24, 1948 |